(12) United States Patent
Kishikawa et al.

(10) Patent No.: US 11,117,225 B2
(45) Date of Patent: Sep. 14, 2021

(54) FIXING JIG, STEEL MATERIAL HOLDING DEVICE, AND STEEL MATERIAL HOLDING METHOD

(71) Applicant: Kobe Steel, Ltd., Kobe (JP)

(72) Inventors: Hirohisa Kishikawa, Kanagawa (JP); Shigeto Takada, Kanagawa (JP); Yuji Taniguchi, Kanagawa (JP); Yoshiya Takemura, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 181 days.

(21) Appl. No.: 16/483,291

(22) PCT Filed: Jan. 29, 2018

(86) PCT No.: PCT/JP2018/002809
§ 371 (c)(1),
(2) Date: Aug. 2, 2019

(87) PCT Pub. No.: WO2018/143139
PCT Pub. Date: Aug. 9, 2018

(65) Prior Publication Data
US 2019/0375057 A1    Dec. 12, 2019

(30) Foreign Application Priority Data
Feb. 3, 2017   (JP) .............................. JP2017-018692

(51) Int. Cl.
*B23Q 3/06* (2006.01)
*B23Q 3/10* (2006.01)
(Continued)

(52) U.S. Cl.
CPC ........ *B23K 37/047* (2013.01); *B23K 37/0443* (2013.01); *B23Q 3/06* (2013.01);
(Continued)

(58) Field of Classification Search
CPC .............. B23K 37/047; B23K 37/0443; B23K 2103/04; B23K 2101/28; B23Q 3/06;
(Continued)

(56) References Cited

U.S. PATENT DOCUMENTS 743,290 A * 11/1903 Ketterer .................. B66F 3/08
254/98

FOREIGN PATENT DOCUMENTS

| JP | 2010-253592 A | 11/2010 |
| JP | 2011-51008 A | 3/2011 |

(Continued)

OTHER PUBLICATIONS

Nose, Tetsuro; JP-2013081993—A Machine Translation (Year: 2013).*
(Continued)

*Primary Examiner* — Lee A Holly
(74) *Attorney, Agent, or Firm* — Oblon, McClelland, Maier & Neustadt, L.L.P.

(57) ABSTRACT

A fixing jig for fixing a steel material includes a nut, a screw shaft screwed to the nut, a handle attached to the screw shaft, and a contact portion relatively rotatably attached to the handle. A plurality of screw holes are formed in an outer peripheral portion of the contact portion. The first extension member includes a long cylindrical portion, an extension side contact portion provided at a tip end portion of the cylindrical portion, and a connecting portion provided at a base end portion of the cylindrical portion and connected to the contact portion. The connecting portion includes a plurality of through holes formed in an outer peripheral portion of the connecting portion, and long engagement holes each extending from each of the plurality of through holes.

12 Claims, 11 Drawing Sheets

(51) Int. Cl.
    *B23K 37/04*     (2006.01)
    *B23K 37/047*    (2006.01)
    B23K 103/04      (2006.01)
    B23K 101/28      (2006.01)

(52) U.S. Cl.
    CPC ............. *B23Q 3/064* (2013.01); *B23Q 3/107*
                (2013.01); *B23K 2101/28* (2018.08); *B23K*
                *2103/04* (2018.08); *B23Q 3/062* (2013.01);
                                    *B23Q 3/106* (2013.01)

(58) Field of Classification Search
    CPC ........ B23Q 3/064; B23Q 3/107; B23Q 3/062;
                            B23Q 3/106; B66F 3/08
    See application file for complete search history.

(56)             References Cited

FOREIGN PATENT DOCUMENTS

JP        2013-81993 A      5/2013
    JP        2013081993 A  *   5/2013
    JP        2013-202673 A    10/2013

OTHER PUBLICATIONS

International Search Report and Written Opinion dated Feb. 20, 2018 in PCT/JP2018/002809, citing documents AO and AP therein, 14 pages (with English translation).

* cited by examiner

FIXING JIG, STEEL MATERIAL HOLDING DEVICE, AND STEEL MATERIAL HOLDING METHOD

TECHNICAL FIELD

The present invention relates to a fixing jig, a steel material holding device, and a steel material holding method, for fixing and holding a steel material in order to enable a welding device such as a welding robot to weld the steel material in any postures.

BACKGROUND ART

A steel material holding device of related arts includes: an annular holding portion for accommodating a steel material therein and holding the steel material; and a rotating portion (bracket) for rotating the annular holding portion. Four fixing jigs for holding the steel material in a radial direction of the annular holding portion are provided in the annular holding portion (see, for example, Patent Literature 1).

Here, H-shape steel is widely known as one of steel materials, and there are many standards (shapes) and sizes for the H-shape steel. Therefore, when the H-shape steel is mounted on a steel material holding device, it is necessary to prepare a specialized fixing jig adapted to a shape and a size of the H-shape steel or to attach a specialized attachment for the H-shape steel.

For example, in the steel material holding device described in Patent Literature 1, it is necessary to prepare a plurality of specialized fixing jigs for each shape and size of the H-shape steel and to reassign the fixing jigs each time depending on the shape and size of the H-shape steel to be mounted. When the fixing jigs are used in common, it is necessary to attach an attachment to the H-shape steel in advance and fix the attachment with the fixing jigs. Therefore, a lot of costs, such as equipment, labor, and time, are required to fix the H-shape steel, and an operation thereof is complicated.

Therefore, in order to make it possible to cope with various shapes and sizes of various types of H-shape steel without using specialized fixing jigs or the like, a known steel material holding device is proposed (see, for example, Patent Literature 2). The known steel material holding device includes: a pair of gripping tools (fixing jigs) for gripping a web of the H-shape steel in a thickness direction; and an expansion-contraction device that expands and contracts while maintaining symmetry of a distance between the pair of gripping tools with respect to a center of the distance. Each of the gripping tools includes: a fixed side claw that is moved in a fixed posture by the expansion-contraction device; and an opening-closing side claw that faces the fixed side claw and opens and closes. Flange pressing portions are provided on outer sides of each fixed side claw.

CITATION LIST

Patent Literature

PTL 1: JP-A-2013-202673
PTL 2: JP-A-2011-51008

SUMMARY OF INVENTION

Technical Problem

However, the steel material holding device described in Patent Literature 2 is only for H-shape steel as the steel material, and cannot fix other steel materials such as I-shape steel and angled steel pipes such as quadrangular steel pipes. In addition, the steel material holding device described in Patent Literature 2 cannot fix H-shape steel of all standards, particularly, cannot fix large-sized H-shape steel.

The present invention is made in view of the problems described above, and an object of the present invention is to provide a fixing jig, a steel material holding device, and a steel material holding method, that can easily fix steel materials of various shapes, such as H-shape steel, I-shape steel, and angled steel pipes, and steel materials of various sizes.

Solution to Problem

In order to achieve the object, the fixing jig of the present invention is a fixing jig configured to press and fix a steel material, including: a nut provided on a predetermined attaching base; a screw shaft screwed to the nut; a handle attached to the screw shaft, the handle being configured to rotate the screw shaft; and a contact portion relatively rotatably attached to the handle and configured to contact the steel material or a first extension member, wherein a plurality of screw holes are formed in an outer peripheral portion of the contact portion, the first extension member is attachable to and detachable from the contact portion, the first extension member includes: a long cylindrical portion; an extension side contact portion provided at a tip end portion of the cylindrical portion and configured to contact the steel material or a second extension member; and a connecting portion provided at a base end portion of the cylindrical portion and connected to the contact portion, the connecting portion includes: a plurality of through holes formed in an outer peripheral portion of the connecting portion; and long engagement holes each extending from each of the plurality of through holes, and when the connecting portion of the first extension member is connected to the contact portion, a bolt is engaged with the screw hole formed in the contact portion along a longitudinal direction of the first extension member, and the bolt is engaged with the long engagement hole via the through hole of the connecting portion.

In the fixing jig of the present invention, the plurality of through holes are formed symmetrically at even-numbered positions in a radial direction.

In the fixing jig in the present invention, the bolt includes a circular head portion which is larger than a diameter of the screw shaft, the diameter of the screw shaft is 10 mm or more, and a diameter of the head portion is 1.1 to 1.5 times of the diameter of the screw shaft.

The fixing jig in the present invention further includes: the second extension member detachably attached to the extension side contact portion of the first extension member, and the second extension member includes an extension side contact portion configured to contact the steel material at a tip end portion of the second extension member.

In the fixing jig in the present invention, a contact area of at least one of the contact portion of the fixing jig, the extension side contact portion of the first extension member, and the extension side contact portion of the second extension member is within a range of 2500 to 3500 mm$^2$.

In addition, the fixing jig of the present invention is a fixing jig configured to press and fix a steel material, including: a nut provided on a predetermined attaching base; a screw shaft screwed to the nut; a handle attached to the screw shaft, the handle being configured to rotate the screw shaft; and a contact portion relatively rotatably attached to the handle and configured to contact the steel material or a first extension member, wherein the first extension member is attachable to and detachable from the contact portion, the first extension member includes: a long cylindrical portion; an extension side contact portion provided at a tip end portion of the cylindrical portion and configured to contact the steel material or a second extension member; and a connecting portion provided at a base end portion of the cylindrical portion and connected to the contact portion, the second extension member is included by connecting to the extension side contact portion of the first extension member via a hinge, and the second extension member includes an extension side contact portion configured to contact the steel material at a tip end portion of the second extension member.

In addition, the steel material holding device of the present invention is a steel material holding device configured to operate at least in a pair, hold a long steel material and rotate the steel material in an arbitrary posture, the steel material holding device including: a holding portion, which is formed in an annular shape and provided upright along a vertical direction, the holding portion being configured to accommodate the steel material therein and hold the steel material; and a rotating portion that rotatably supports the holding portion, wherein the holding portion includes a plurality of fixing jigs provided on each inner surface of the holding portion, the fixing jigs being configured to press and fix the steel material at least in a first direction along a radial direction of the holding portion, and a second direction orthogonal to the first direction and along the radial direction of the holding portion, and at least one of the plurality of the fixing jigs is the fixing jig according to of the present invention.

In addition, the steel material holding method of the present invention is a steel material holding method using a steel material holding device, wherein the steel material holding device includes: a holding portion, which is formed in an annular shape and provided upright along a vertical direction, the holding portion being configured to accommodate a steel material therein and hold the steel material; and a rotating portion that rotatably supports the holding portion, the holding portion is openable and closable, the holding portion includes four fixing jigs provided on each inner surface of the holding portion, the fixing jigs being configured to press and fix the steel material in a first direction along a radial direction of the holding portion, and a second direction orthogonal to the first direction and along the radial direction of the holding portion, and the four fixing jigs each include: a nut attached to the holding portion; a screw shaft screwed to the nut; a handle attached to the screw shaft, the handle being configured to rotate the screw shaft; and a contact portion relatively rotatably attached to the handle and being configured to contact the steel material, the steel material holding method including: a pre-mounting rotating step of rotating the holding portion by the rotating portion to make the first direction coincide with the vertical direction before the steel material is mounted on the steel material holding device; an opening step of opening the holding portion; a height adjusting step of rotating the handle of the fixing jig positioned on a lower side in the vertical direction to adjust a height of the fixing jig positioned on the lower side in the vertical direction depending on a size of the steel material to be mounted; a jig avoidance step of rotating the handles of the fixing jig positioned on an upper side in the vertical direction and the two fixing jigs positioned in a horizontal direction to adjust positions of the fixing jig positioned on the upper side in the vertical direction and the two fixing jigs positioned in the horizontal direction so that the fixing jigs do not interfere with the steel material to be mounted; a placing step of placing the steel material on the fixing jig positioned on the lower side in the vertical direction; a closing step of closing the holding portion; and a clamping step of rotating the handles of the fixing jig positioned on the upper side in the vertical direction and the two fixing jigs positioned in the horizontal direction to clamp and fix the steel material.

The steel material holding method in the present invention, further including, between the closing step and the clamping step: an extension member attaching step of attaching at least one extension member to at least one of the fixing jig positioned on the upper side in the vertical direction and the two fixing jigs positioned in the horizontal direction.

Advantageous Effects of Invention

According to the fixing jig of the present invention, since the steel material is clamped and fixed using the fixing jig having a structure that can expand toward and contract from the steel material and the extension member that can be easily attached to and detached from the steel material, the steel materials of various shapes, such as the H-shape steel, the I-shape steel, and the angled steel pipes, and the steel materials of various sizes can be easily fixed.

According to the steel material holding device of the present invention, since the steel material is clamped and fixed from a plurality of directions using a plurality of fixing jigs having the structure that can expand toward and contract from the steel material and the extension member that can be easily attached to and detached from the steel material, the steel materials of various shapes, such as the H-shape steel, the I-shape steel, and the angled steel pipes, and the steel materials of various sizes can be easily fixed.

According to the steel material holding method of the present invention, since the steel material is clamped and fixed from a plurality of directions using a plurality of fixing jigs having the structure that can expand toward and contract from the steel material and the extension member that can be easily attached to and detached from the steel material, the steel materials of various shapes, such as the H-shape steel, the I-shape steel, and the angled steel pipes, and the steel materials of various sizes can be easily fixed.

DESCRIPTION OF EMBODIMENTS

Hereinafter, an embodiment of a fixing jig, a steel material holding device, and a steel material holding method according to the present invention is described in detail with reference to the drawings.

<<Steel Material Holding Device>>

First, in order to grasp an overall image of the fixing jig, the steel material holding device, and the steel material holding method of the present embodiment, a steel material holding device including a fixing jig will be described. The steel material holding device is also known as a positioner, and is configured at least in pairs. In order to enable a long steel material to be welded in any postures by a welding device such as a welding robot, the steel material holding device fixes two end portions of the steel material, holds and rotates the steel material. A pair of steel material holding devices has basically the same configuration, and one of the pair of steel material holding device is described in the following description. In the present embodiment, the case where H-shape steel as an example of the steel material to be held is held is described.

Figure 1:
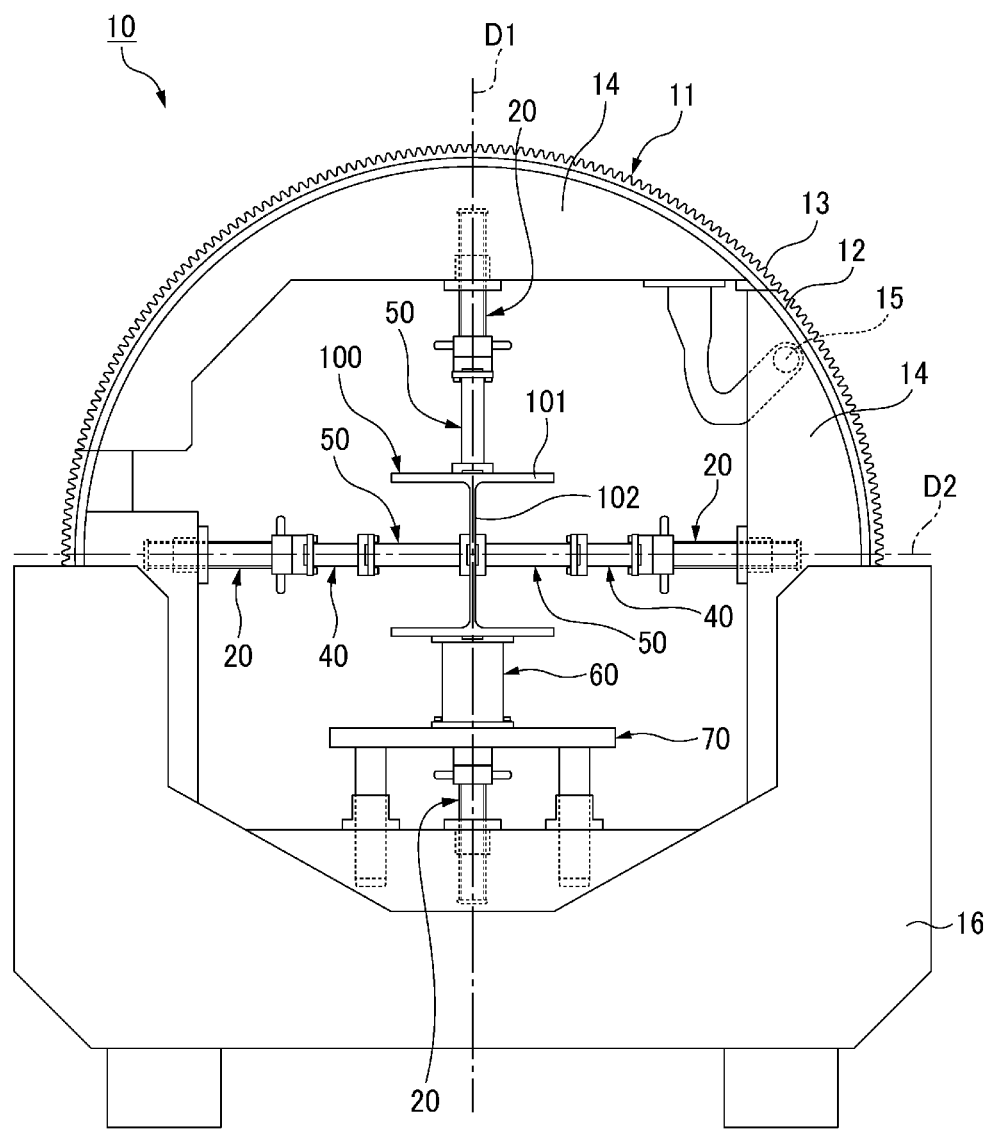
FIG. 1 is a schematic front view of a steel material holding device according to an embodiment of the present invention.

As shown in FIG. 1, a steel material holding device 10 of the present embodiment includes: a holding portion 11 which is formed in an annular shape so as to allow the holding portion 11 to be divided in an up-down direction, and provided upright in a vertical direction, the holding portion 11 being configured to accommodate an H-shape steel 100 therein and hold the H-shape steel 100; and a rotating portion 16 that rotatably supports the holding portion 11.

Here, the H-shape steel 100 is described. The H-shape steel 100 is formed to have an H-shaped cross section. In a cross-sectional view, the H-shape steel 100 is formed in a long shape having a pair of flat plate-shaped flanges 101 arranged to face each other, and a flat plate-shaped web 102 connecting the pair of flanges 101 at the middle in a width direction.

In the present embodiment, the H-shape steel 100 is placed on the holding portion 11 of the steel material holding device 10 in a posture in which the web 102 is vertical.

(Holding Portion)

The holding portion 11 includes: an annular portion 12 formed in an annular shape and provided with a rack gear 13 over an entire circumference of an outer peripheral surface; a frame body portion 14 provided on an inner surface of the annular portion 12 and having a substantially rectangular inner shape; and first to fourth fixing jigs 20 fixed to an inner surface of the frame body portion 14 with the inner surface of the frame body portion 14 serving as an attaching base, the first to fourth fixing jigs pressing and fixing the H-shape steel 100 in a first direction D1 along a radial direction of the holding portion 11 and a second direction D2 orthogonal to the first direction and along the radial direction of the holding portion 11.

In the present description, in FIG. 1, the fixing jig 20 positioned on a right side in a horizontal direction is referred to as the first fixing jig 20, the fixing jig 20 positioned on a left side in the horizontal direction is referred to as the third fixing jig 20, the fixing jig 20 positioned on an upper side in the vertical direction is referred to as the second fixing jig 20, and the fixing jig 20 positioned on a lower side in the vertical direction is referred to as the fourth fixing jig 20. The first to fourth fixing jigs have basically the same configuration, and auxiliary members described below (a first extension member 40, a second extension member 50, a third extension member 60, and an auxiliary table 70) are additionally attached depending on a shape and size of the steel material to be held, an attachment position thereof, and the like.

(Annular Portion)

A lower portion of the annular portion 12 is accommodated in the rotating portion 16, and an upper portion of the annular portion 12 is exposed to the outside. The annular portion 12 is divided into two portions in the up-down direction so that an upper arc portion thereof can be opened and closed with respect to a lower arc portion.

(Frame Body Portion)

Similarly to the case of the annular portion 12, the frame body portion 14 is divided into two portions in the up-down direction, and a hinge 15 is integrally attached to the frame body portion 14 on one side (right side in FIG. 1) of divided portions of the frame body portion 14. Accordingly, an upper arc portion of the holding portion 11 can be rotated about the hinge 15 so as to be opened and closed.

(Fixing Jig)

Figure 2:
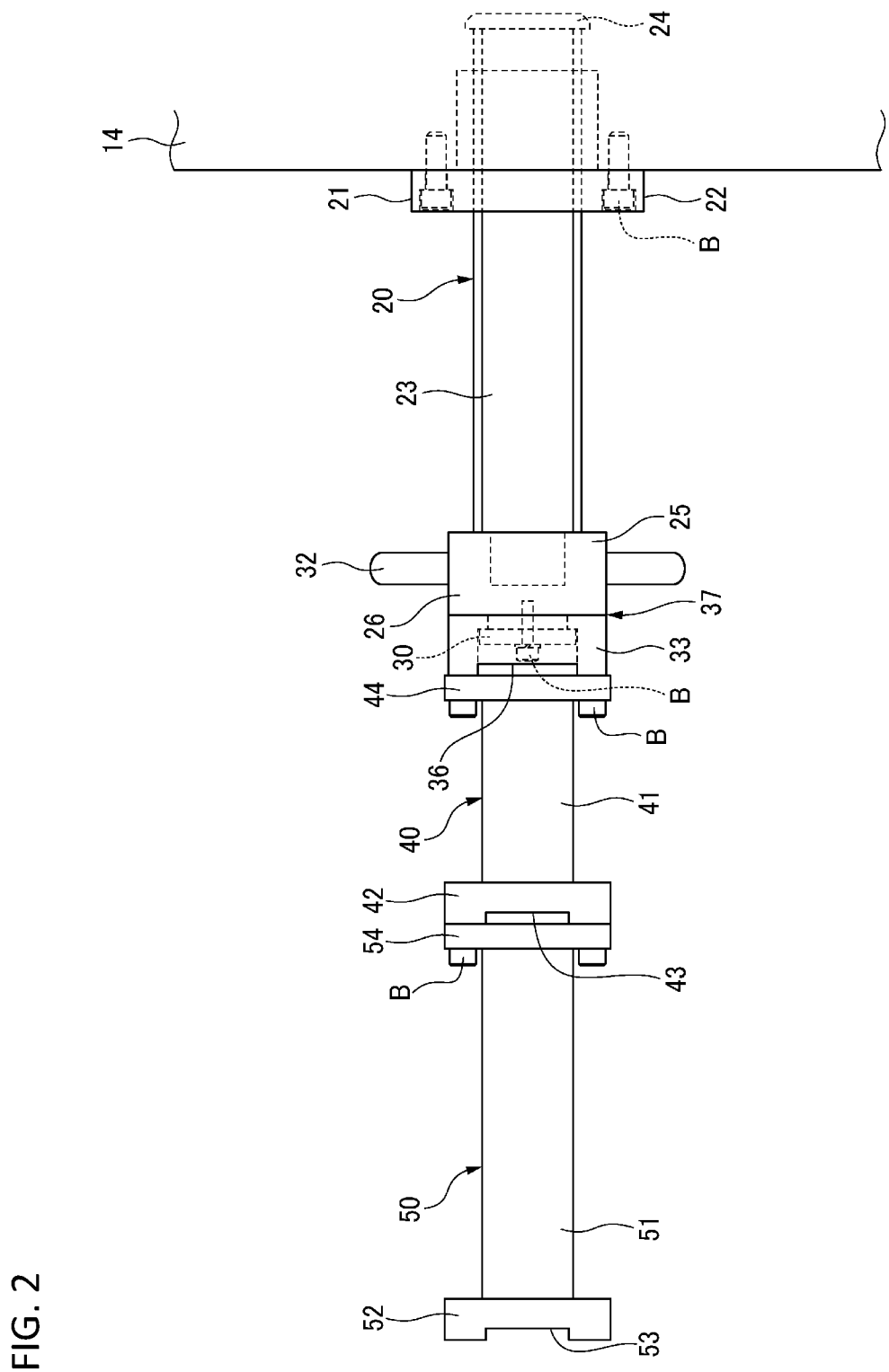
FIG. 2 is a front view of a fixing jig positioned on a right side in a horizontal direction shown in FIG. 1, and a first extension member and second extension member attached to the fixing jig.
Figure 3:
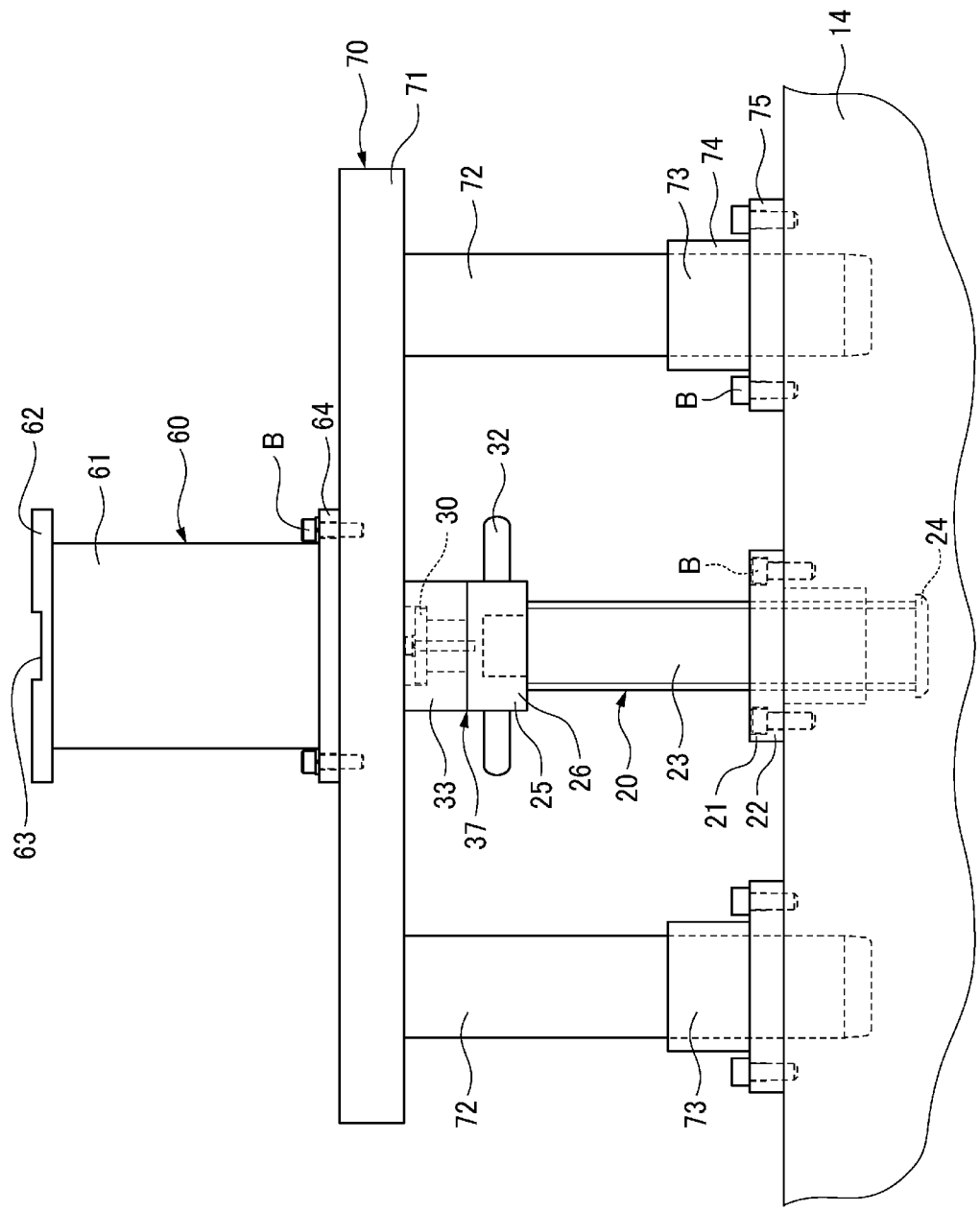
FIG. 3 is a front view of a fixing jig positioned on a lower side in a vertical direction shown in FIG. 1, and an auxiliary table attached to the fixing jig and a third extension member.
Figure 4:
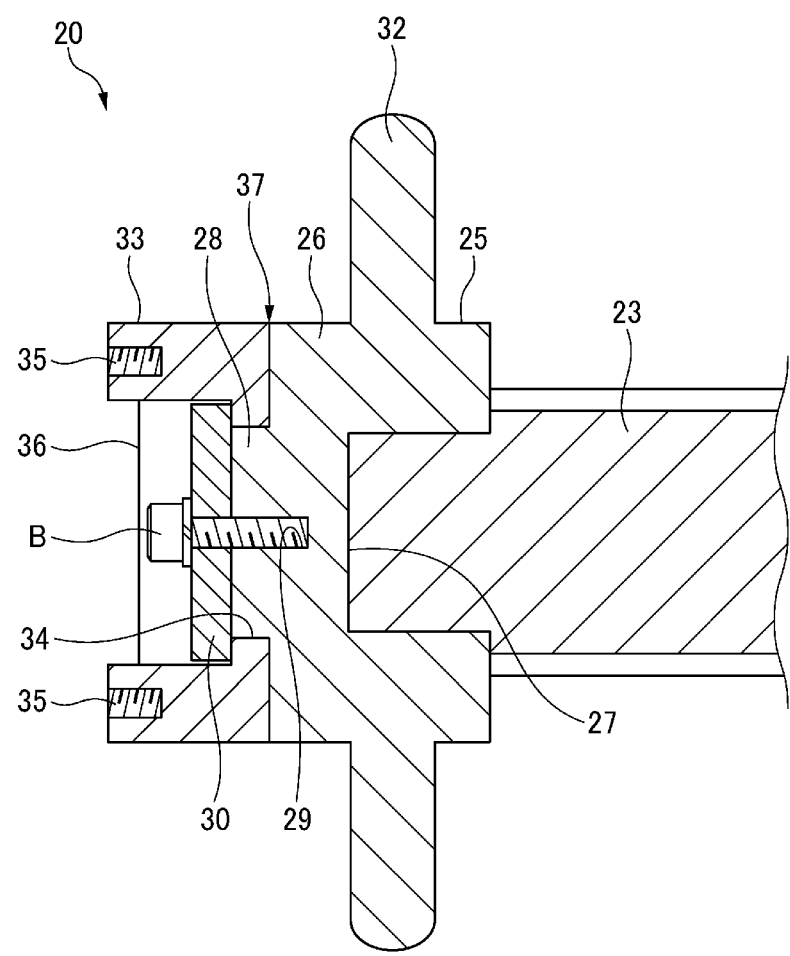
FIG. 4 is an enlarged cross-sectional view of a periphery of a handle of the fixing jig shown in FIG. 2.

As shown in FIG. 2 to FIG. 4, the fixing jig 20 includes: a nut 21 fixed to an inner surface of the frame body portion 14 of the holding portion 11; a screw shaft 23 screwed to the nut 21; a handle 32 integrally attached to the screw shaft 23, the handle 32 being configured to rotate the screw shaft 23; a contact portion 33 that contacts the H-shape steel 100 or the first extension member 40 described below; and a relative rotation mechanism 37 that relatively rotatably connects the handle 32 and the contact portion 33.

(Nut)

A screw groove is formed in an inner peripheral surface of the nut 21 of the fixing jig 20. A flange 22 extending radially outward is provided at a tip end portion of the nut 21. The nut 21 is fixed to the inner surface of the frame body portion 14 of the holding portion 11 through a bolt B at the flange 22. A space in which the screw shaft 23 can move is formed inside the frame body portion 14 of the holding portion 11 along an axial direction of the nut 21.

(Screw Shaft)

A screw groove is formed on an outer peripheral surface of the screw shaft 23 of the fixing jig 20. A circular stopper member 24 is fixedly attached to a base end of the screw shaft 23. An outer diameter of the stopper member 24 is slightly larger than an outer diameter of the screw shaft 23. Accordingly, even when the screw shaft 23 is moved to an uppermost position upon screwing with the nut 21, the stopper member 24 abuts against an end surface of the nut 21 to prevent the screw shaft 23 from separating from the nut 21. The handle 32 is fixed to a tip end portion of the screw shaft 23.

(Handle)

The handle 32 includes a cylindrical member 25 fixed to the tip end portion of the screw shaft 23, and a plurality of rod-shaped members provided on an outer peripheral surface of the cylindrical member 25. Therefore, the screw shaft 23 is rotated by rotating the handle 32.

The cylindrical member 25 includes: a first cylindrical portion 26 including a fitting hole 27 for fitting the tip end portion of the screw shaft 23 to a base end surface; and a second cylindrical portion 28 which is provided concentrically with a tip end surface of the first cylindrical portion 26, a diameter of the second cylindrical portion 28 being smaller than a diameter of the first cylindrical portion 26.

A disk member 30 is attached to the second cylindrical portion 28 of the cylindrical member 25 by the bolt B at a concentric position. An outer diameter of the disk member 30 is larger than that of the second cylindrical portion 28 of the cylindrical member 25, and is slightly smaller than an inner diameter of the contact portion 33 described below.

(Contact Portion)

As shown in FIG. 4, the contact portion 33 is formed in a cylindrical shape. A small-diameter stepped portion 34 is provided on an inner peripheral surface of a base end portion of the contact portion 33. An inner diameter of the small-diameter stepped portion 34 is formed to have a dimension to fit in an outer peripheral surface of the second cylindrical portion 28 of the handle 32. A notch 36 is formed on a tip end surface of the contact portion 33 in the radial direction. The notch 36 functions as a grip upon contacting the H-shape steel 100.

As shown in FIG. 4, a pair of screw holes 35 is formed symmetrically in the radial direction on a tip end surface of an outer peripheral portion of the contact portion 33. The bolt B is screwed into the pair of screw holes 35 when the first extension member 40 or second extension member 50 described below is attached to the fixing jig 20.

(Relative Rotation Mechanism)

As shown in FIG. 2 to FIG. 4, one end surface (a surface on a handle side) of the disk member 30 contacts an axial direction inner side surface of the small-diameter stepped portion 34 in a state in which the small-diameter stepped portion 34 of the contact portion 33 is fitted to the second cylindrical portion 28 of the handle 32. As a result, the contact portion 33 is relatively rotatably attached to the second cylindrical portion 28 of the handle 32. Therefore, the relative rotation mechanism 37 is configured by the second cylindrical portion 28 of the handle 32, the disk member 30, and the small-diameter stepped portion 34 of the contact portion 33.

Next, the auxiliary members that are additionally attached to the fixing jig 20 are described.

(First Extension Member)

As shown in FIG. 1 and FIG. 2, the first extension member 40 is attached to the contact portions 33 of the first and third fixing jigs 20. The first extension member 40 is detachably attached to the fixing jig 20 depending on a shape and size of the steel material to be mounted, and in the present embodiment, the first extension member 40 is used to compensate a stroke amount with respect to the H-shape steel 100 when the stroke amount provided only by the fixing jig 20 is insufficient.

As shown in FIG. 2, the first extension member 40 includes: a long cylindrical portion 41; an annular extension side contact portion 42 which is provided at a tip end portion of the cylindrical portion 41 and contacts the H-shape steel 100 or the second extension member 50 described below; and an annular connecting portion 44 provided at a base end portion of the cylindrical portion 41. A total length of the first extension member 40 in this embodiment is 150 mm.

Figure 5:
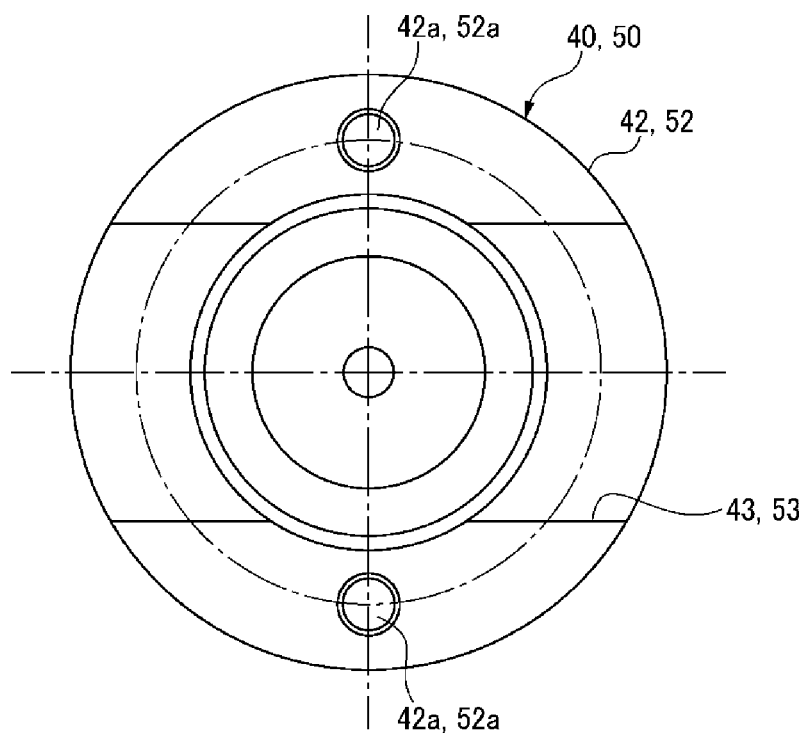
FIG. 5 is a side view of an extension side contact portion of the first or second extension member shown in FIG. 2.

As shown in FIG. 5, a notch 43 is formed on a tip end surface of the extension side contact portion 42 in the radial direction, similarly to the case of the contact portion 33 of the fixing jig 20. Similarly to the case of the contact portion 33 of the fixing jig 20, a pair of screw holes 42a is formed symmetrically in the radial direction on the tip end surface of the extension side contact portion 42. The pair of screw holes 42a is used when the second extension member 50 described below is attached to the first extension member 40.

Figure 6:
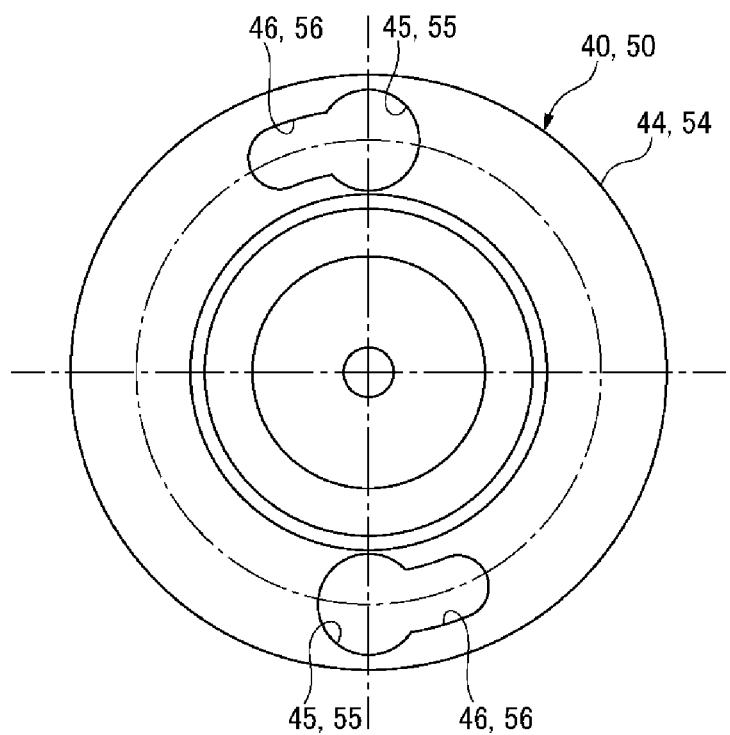
FIG. 6 is a side view of a connecting portion of the first or second extension member shown in FIG. 2.

As shown in FIG. 6, in the connecting portion 44, a pair of through holes 45 formed symmetrically in the radial direction in an outer peripheral portion thereof, and a pair of long engagement holes 46 extending in the same direction from the through holes 45 in a peripheral direction, are formed.

A diameter of the through hole 45 of the connecting portion 44 has a dimension that a head portion of the bolt B attached to the contact portion 33 can pass through. A width dimension (dimension in a direction orthogonal to a longitudinal direction) of the long engagement hole 46 of the connecting portion 44 is a dimension that a screw shaft of the bolt B attached to the contact portion 33 can pass through.

When the first extension member 40 is attached to the fixing jig 20, the bolt B is engaged with each of the pair of screw holes 35 of the contact portion 33 of the fixing jig 20. At this time, the bolt B is loosely screwed into the screw hole 35. Thereafter, the head portion of the bolt B of the contact portion 33 of the fixing jig 20 is inserted into each through hole 45 of the connecting portion 44 of the first extension member 40, the first extension member 40 is rotated in the peripheral direction, and the screw shaft of the bolt B of the contact portion 33 of the fixing jig 20 is engaged with the long engagement hole 46 of the connecting portion 44 of the first extension member 40. As a result, the connecting portion 44 of the first extension member 40 is clamped by the head portion of the bolt B and the contact portion 33, and the first extension member 40 is fixed to the fixing jig 20. Therefore, it is possible to easily attach the first extension member 40 to the fixing jig 20 and detach the first extension member 40 from the fixing jig 20. The bolt B may be further tightened to firmly fix the first extension member 40 to the fixing jig 20.

(Second Extension Member)

As shown in FIG. 1 and FIG. 2, the second extension member 50 is attached to the extension side contact portion 42 of the first extension member 40. In the present embodiment, the second extension member 50 is used to compensate the stroke amount with respect to the H-shape steel 100 when the stroke amount provided by the fixing jig 20 and the first extension member 40 is insufficient. Similarly to the case of the first extension member 40, the second extension member 50 may be attached to the contact portion 33 of the fixing jig 20. The first extension member 40 may be attached to the second extension member 50.

The second extension member 50 has the same configuration as that of the first extension member 40, except that a total length of the second extension member 50 is 250 mm. As shown in FIG. 2, the second extension member 50 includes: a long cylindrical portion 51; a cylindrical extension side contact portion 52 which is provided at the tip end portion of the cylindrical portion 51 and contacts the H-shape steel 100; and an annular connecting portion 54 provided at a base end portion of the cylindrical portion 51.

As shown in FIG. 5, a notch 53 and a pair of screw holes 52a are formed in a tip end surface of the extension side contact portion 52, similarly to the case of the first extension member 40. As shown in FIG. 6, a pair of through holes 55 and a pair of long engagement holes 56 are formed in the connecting portion 54, similarly to the case of the first extension member 40. Procedures for attaching the second extension member 50 to the first extension member 40 are the same as the procedures described above for attaching the first extension member 40 to the fixing jig 20. As shown in FIG. 1, only the second extension member 50 is attached to the second fixing jig 20.

In the present embodiment, the bolt B for attaching the first extension member 40 to the fixing jig 20 and the bolt B for attaching the second extension member 50 to the first extension member 40 each include a circular head portion which is larger than a diameter of the screw shaft. The diameter of the screw shaft is 10 mm or more, and a diameter of the head portion is 1.1 to 1.5 times of the diameter of the screw shaft. The diameter of the screw shaft is 10 mm or more in order to have a connection strength. The upper limit of the diameter is not particularly limited, and the diameter is more preferably 20 mm or less from a viewpoint of an area in which the through hole 45 is formed (depending on specifications of the device).

In the present embodiment, contact areas of the contact portion 33 of the fixing jig 20, the extension side contact portion 42 of the first extension member 40, and the extension side contact portion 52 of the second extension member 50 are preferably within a range of 2500 to 3500 mm$^2$. The fixing of the steel material can be strengthened through setting the contact areas to fall within this range.

(Third Extension Member)

As shown in FIG. 3, the third extension member 60 is fixed to an upper surface of a table portion 71 of the auxiliary table 70 by the bolt B. The third extension member 60 includes: a long cylindrical portion 61; a cylindrical extension side contact portion 62 which is provided at a tip end portion of the cylindrical portion 61 and contacts the H-shape steel 100; and an annular connecting portion 64 provided at a base end portion of the cylindrical portion 61. Similarly to the case of the first extension member 40, a notch 63 is formed in the extension side contact portion 62. A total length of the third extension member 60 is 225 mm, and the cylindrical portion 61, the extension side contact portion 62, and the connecting portion 64 have larger diameters than the first and second extension members 40 and 50.

(Auxiliary Table)

As shown in FIG. 3, the auxiliary table 70 is attached to the contact portion 33 of the fourth fixing jig 20. The auxiliary table 70 is formed in a flat plate shape, and includes: the table portion 71 fixed to a tip end surface of the contact portion 33 of the fourth fixing jig 20; a pair of cylindrical leg portions 72 attached to lower surfaces of left and right end portions of the table portion 71 and extending downward; and a pair of guide portions 73 fixed to the frame body portion 14 of the holding portion 11 to guide the pair of leg portions 72.

Each guide portion 73 includes: a cylindrical portion 74; and a flange 75 provided at a base end portion (lower end portion) of the cylindrical portion 74 and extending outward in the radial direction. Each leg portion 72 is fitted to an inner peripheral surface of the cylindrical portion 74 of the respective guide portion 73. Therefore, when the fourth fixing jig 20 is rotated by the handle 32 and the auxiliary table 70 is moved in the up-down direction, the guide portions 73 guide the leg portions 72 of the auxiliary table 70, so that a horizontal state of the table portion 71 is maintained.

(Rotating Portion)

As shown in FIG. 1, the rotating portion 16 partially accommodates and holds the holding unit 11. The rotating portion 16 includes: a pinion gear (not shown) that meshes with the rack gear 13 of the annular portion 12 of the holding portion 11; and a driving portion (not shown) that drives the pinion gear.

<<On Steel Material Holding Method>>

Figure 7:
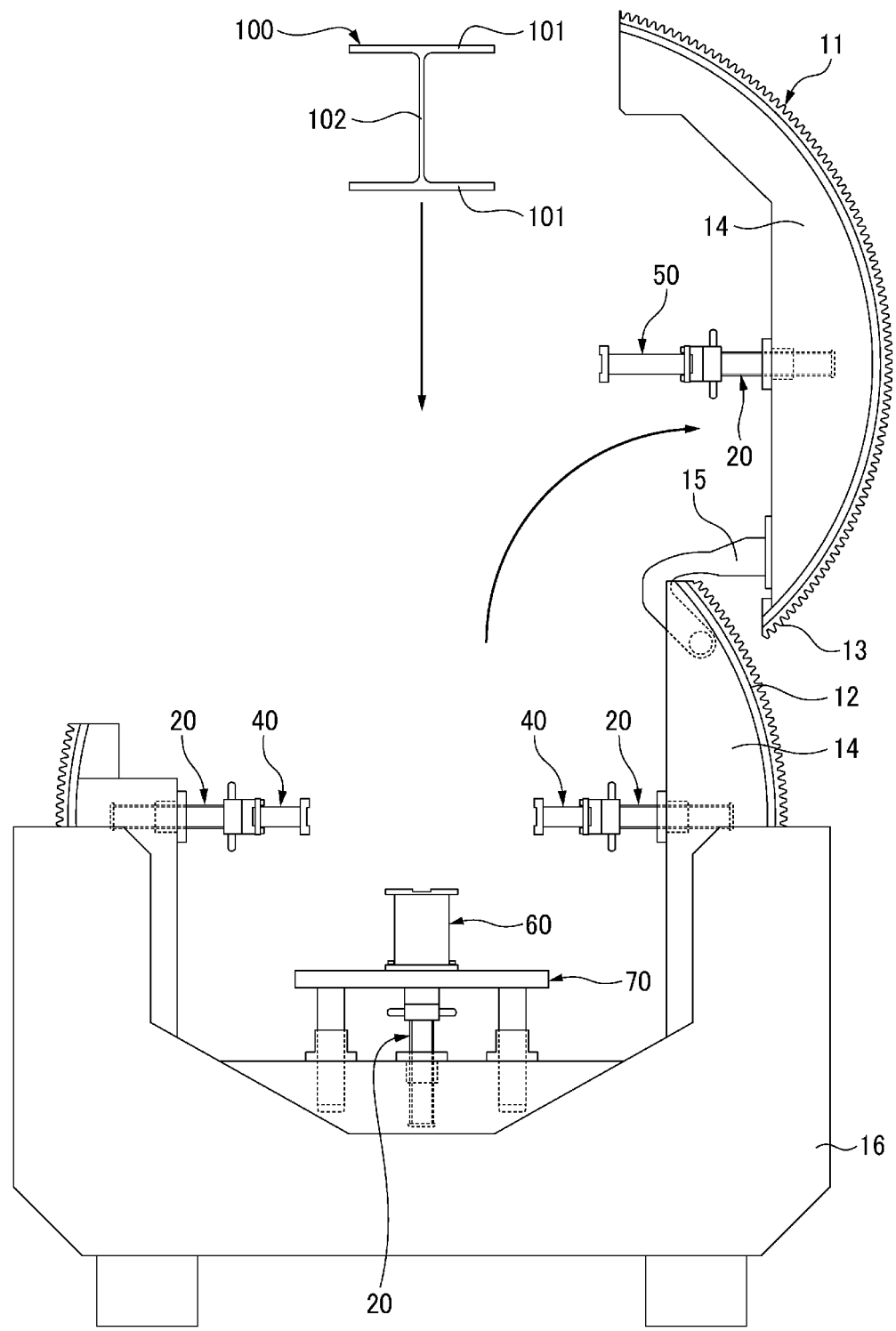
FIG. 7 is a schematic front view of the steel material holding device for describing its operation, which shows a state in which a holding portion is opened so as to mount a steel material.
Figure 8:
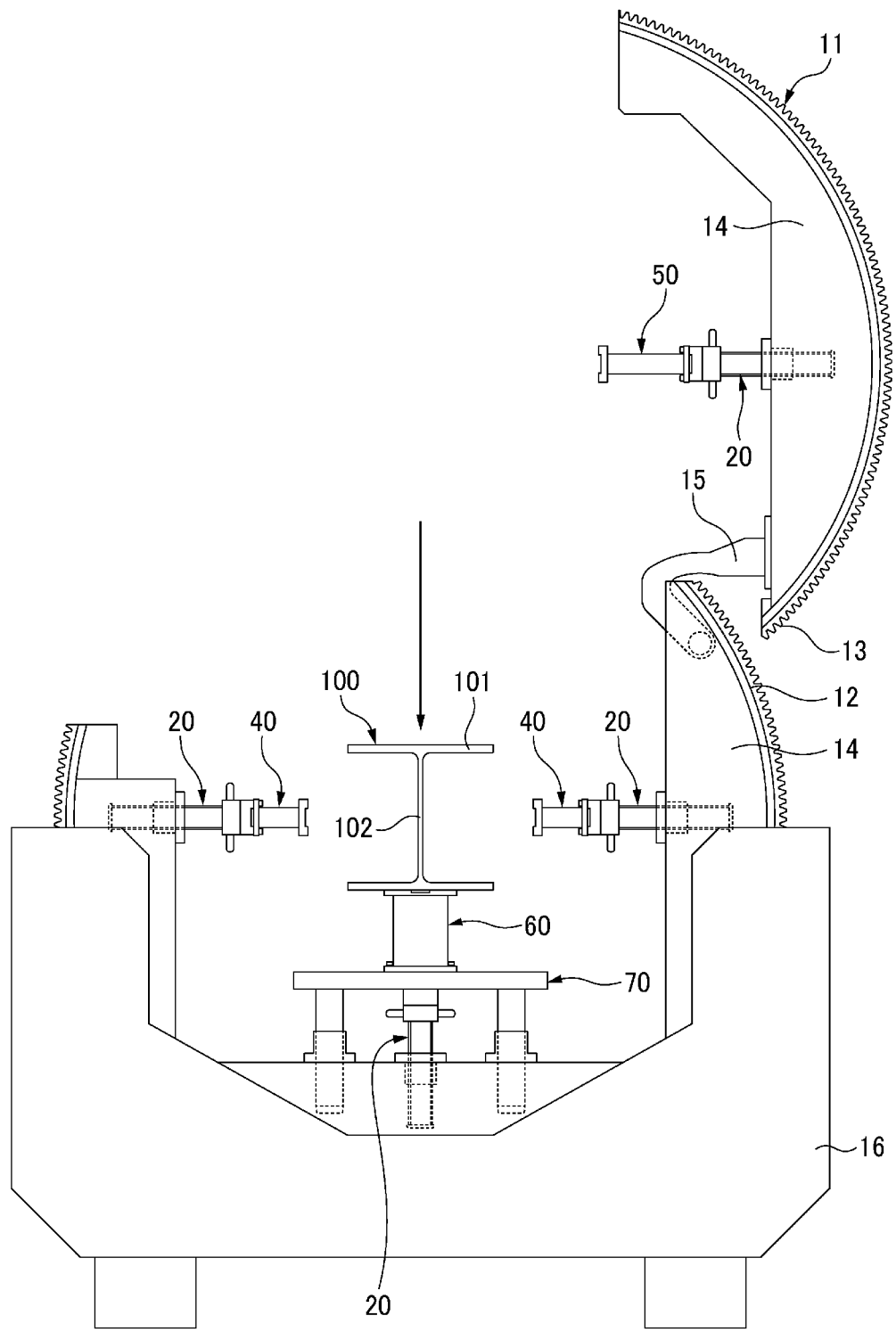
FIG. 8 is a schematic front view of the steel material holding device for describing its operation, which shows a state in which the steel material is mounted.
Figure 9:
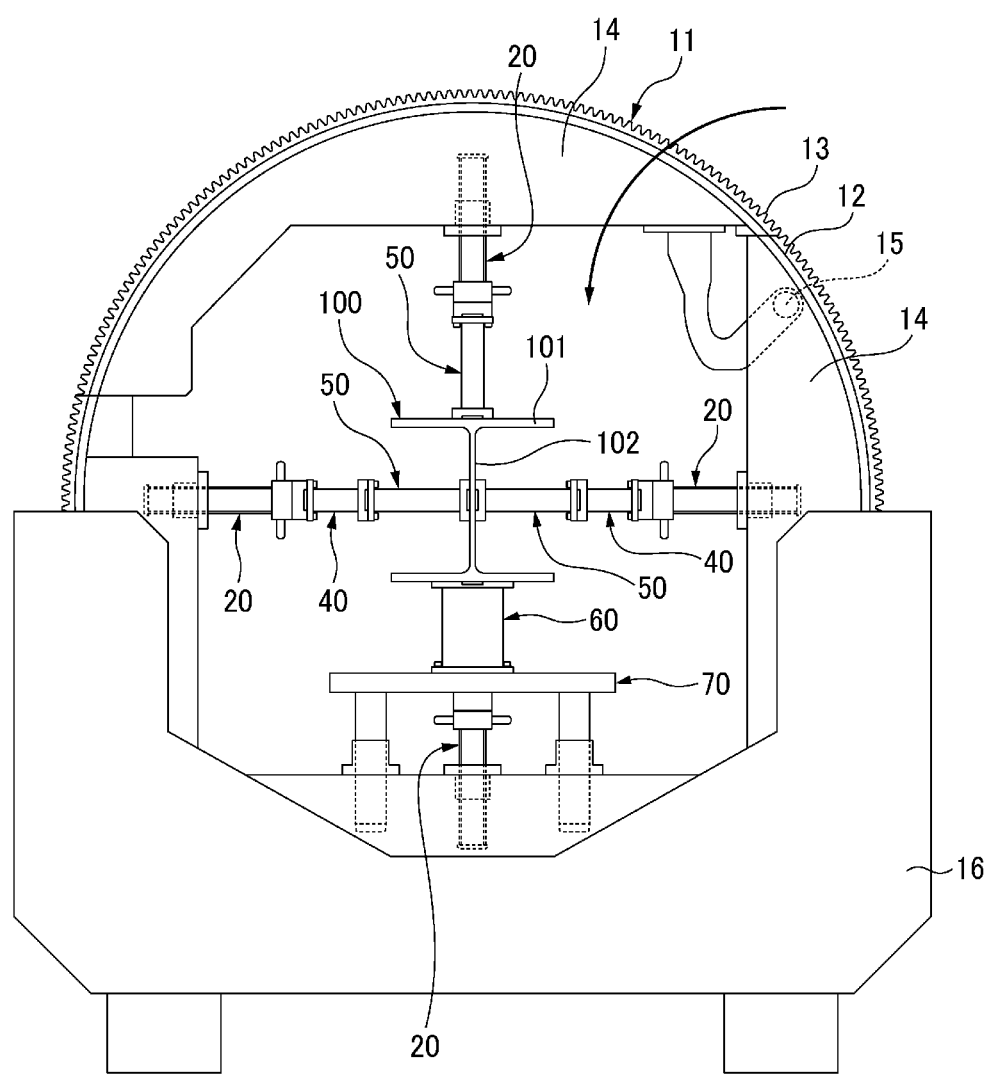
FIG. 9 is a schematic front view of the steel material holding device for describing its operation, which shows a state in which the holding portion is closed and the steel material is fixed.

Next, with reference to FIG. 7 to FIG. 9, a steel material holding method for holding the H-shape steel 100 using the fixing jig 20 and the steel material holding device 10 of the present embodiment is described. In this method, the H-shape steel 100 is mounted on the steel material holding device 10 in the posture in which the web 102 is vertical.

First, before the H-shape steel 100 is mounted on the steel material holding device 10, the holding portion 11 is rotated by the rotating portion 16 and the first direction D1 is made to coincide with the vertical direction (pre-mounting rotating step). Next, as shown in FIG. 7, the upper arc portion of the holding portion 11 is opened (opening step). Next, the handle 32 of the fourth fixing jig 20 is rotated to adjust a height of the third extension member 60 of the fourth fixing jig 20 depending on the size of the H-shape steel 100 to be mounted (height adjusting step). Next, positions of the first to third fixing jigs 20 are adjusted by rotating the handles 32 of the first to third fixing jigs 20 so that the fixing jigs 20 do not interfere with the H-shape steel 100 to be mounted (jig avoidance step). In this method, in consideration of the size of the H-shape steel 100 to be mounted, the first extension members 40 are attached to the first and third fixing jigs 20 in advance, and the second extension member 50 is attached to the second fixing jig 20 in advance.

Next, as shown in FIG. 8, the H-shape steel 100 is placed on the third extension member 60 of the fourth fixing jig 20 (placing step). Next, as shown in FIG. 9, the upper arc portion of the holding portion 11 is closed (closing step). Next, the second extension members 50 are attached to the first extension members 40 of the first and third fixing jigs 20 (extension member attaching step). Next, the handles 32 of the first to third fixing jigs 20 are rotated to clamp and fix the H-shape steel 100 (clamping step). At this time, the second fixing jig 20 clamps and fixes the H-shape steel 100 to the fourth fixing jig 20, and the first and third fixing jigs 20 clamp and fix the web 102 of the H-shape steel 100 from two sides in the horizontal direction. Accordingly, the H-shape steel 100 is clamped and fixed by the first to fourth fixing jigs 20 from four directions.

As described above, according to the fixing jig 20 of the present embodiment, since the steel material 100 is clamped and fixed using the fixing jig 20 having a structure that can expand toward and contract from the steel material 100, the steel materials of various shapes, such as the H-shape steel, the I-shape steel, and the angled steel pipes, and the steel materials of various sizes can be easily fixed.

According to the fixing jig 20 of the present embodiment, since the contact portion 33 of the fixing jig 20 is relatively rotatably attached to the handle 32, even when the handle 32 is rotated in a state in which the contact portion 33 is in contact with the steel material 100, the steel material 100 can be prevented from being damaged since no motion occurs between the steel material 100 and the contact portion 33.

According to the fixing jig 20 of the present embodiment, since the first extension member 40, which is detachably attached to the contact portion 33 of the fixing jig 20, is provided, the stroke amount can be compensated by attaching the first extension member 40 to the fixing jig 20 when the stroke amount provided only by the fixing jig 20 is insufficient, or the stroke amount is excessive which takes a long time to fix, or the like. Accordingly, the fixing jig can be easily used for the steel materials of various shapes or the steel materials of various sizes.

According to the fixing jig 20 of the present embodiment, since the second extension member 50, which is detachably attached to the extension side contact portion 42 of the first extension member 40, is provided, the stroke amount can be compensated by attaching the second extension member 50 to the first extension member 40 when the stroke amount provided only by the fixing jig 20 and the first extension member 40 is insufficient, or the stroke amount is excessive which takes a long time to fix, or the like. Accordingly, the fixing jig can be easily used for the steel materials of various shapes or the steel materials of various sizes.

According to the fixing jig 20 of the present embodiment, since the through holes 45, 55 and the long engagement holes 46, 56 are formed in the connecting portion 44 of the first extension member 40 and the connecting portion 54 of the second extension member 50, strength of the fixing jig 20 and easiness for attaching and detaching the first and second extension members 40, 50 can be improved. The steel material holding device 10 to which the fixing jig 20 of the present invention is adopted is generally used to fix a huge steel material. Therefore, it is difficult to replace or extend the fixing jig in a steel material holding device of related arts, since the fixing jig is also large and heavy in proportion to the steel material holding device.

According to the fixing jig 20 of the present embodiment, since the pair of through holes 45 of the first extension member 40 and the pair of through holes 55 of the second extension member 50 are formed symmetrically in the radial direction, the easiness for attaching and detaching the first and second extension members 40, 50 can be further improved. In this way, from the viewpoint of the easiness for attaching and detaching, the pair of through holes are preferably formed at two positions and formed symmetrically in the radial direction.

According to the steel material holding device 10 and the steel material holding method in the present embodiment, since the steel material 100 is clamped and fixed from a plurality of directions using the four fixing jigs 20 having the structures that can expand toward and contract from the steel material 100, the steel materials of various shapes, such as the H-shape steel, the I-shape steel, and the angled steel pipes, and the steel materials of various sizes can be easily fixed.

Figure 10:
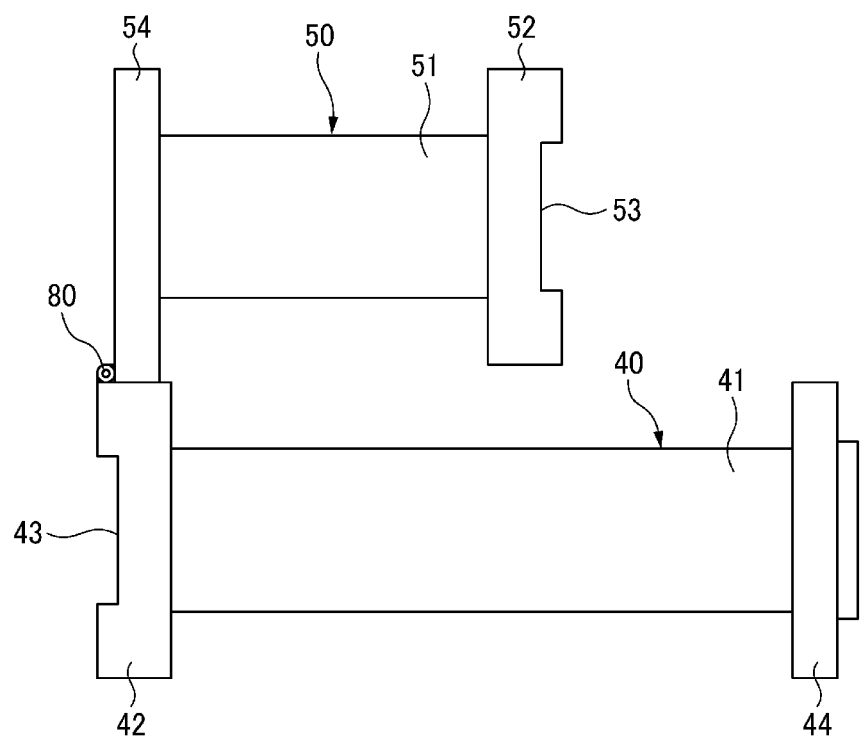
FIG. 10 is a front view of an extension member in a modification.

Next, a modification of the extension member of the present embodiment is described with reference to FIG. 10. In the present modification, the connecting portion 54 of the second extension member 50 is connected to the extension side contact portion 42 of the first extension member 40 via a hinge 80.

In the present modification, the second extension member 50 can be connected to the first extension member 40 simply by rotating the second extension member 50 relative to the first extension member 40. Therefore, since time for attaching the second extension member 50 to the first extension member 40 can be shortened, the steel material can be more easily fixed. In this case, since the first and second extension members 40, 50 are connected by the hinge 80, there is no need to form the screw hole 42a of the extension side contact portion 42 of the first extension member 40, and the through holes 55 and the long engagement holes 56 of the connecting portion 54 of the second extension member 50.

Figure 11:
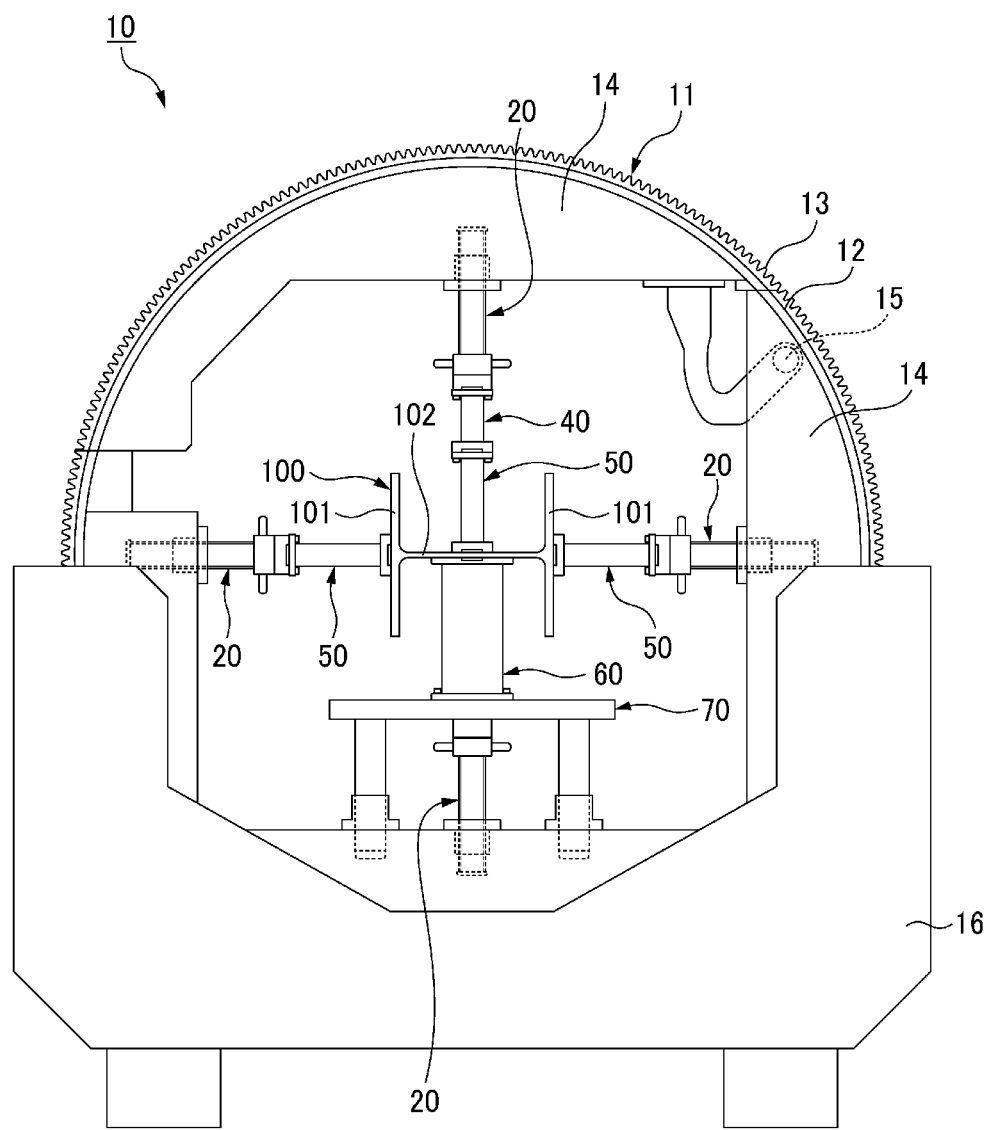
FIG. 11 is a schematic front view of the steel material holding device for describing another method of holding H-shape steel.

Next, another method for holding the H-shape steel 100 using the steel material holding device 10 of the present embodiment is described with reference to FIG. 11. In this method, the H-shape steel 100 is mounted on the steel material holding device 10 in a posture in which the web 102 is horizontal.

In this method, in consideration of the size of the H-shaped steel 100 to be mounted, the second extension members 50 are attached in advance to the first and third fixing jigs 20 positioned in the horizontal direction, the first and second extension members 40, 50 are attached in advance to the second fixing jig 20 positioned on the upper side in the vertical direction, and it is unnecessary to attach any more extension members to the first to third fixing jigs 20. Accordingly, in the present method, since the extension member attaching step in the above-described steel material holding method is not necessary, the holding of the steel material is completed by the pre-mounting rotating step, the opening step, the height adjusting step, the jig avoidance step, the placing step, the closing step, and the clamping step. A member having a suitable length is used as the third extension member 60.

Figure 12:
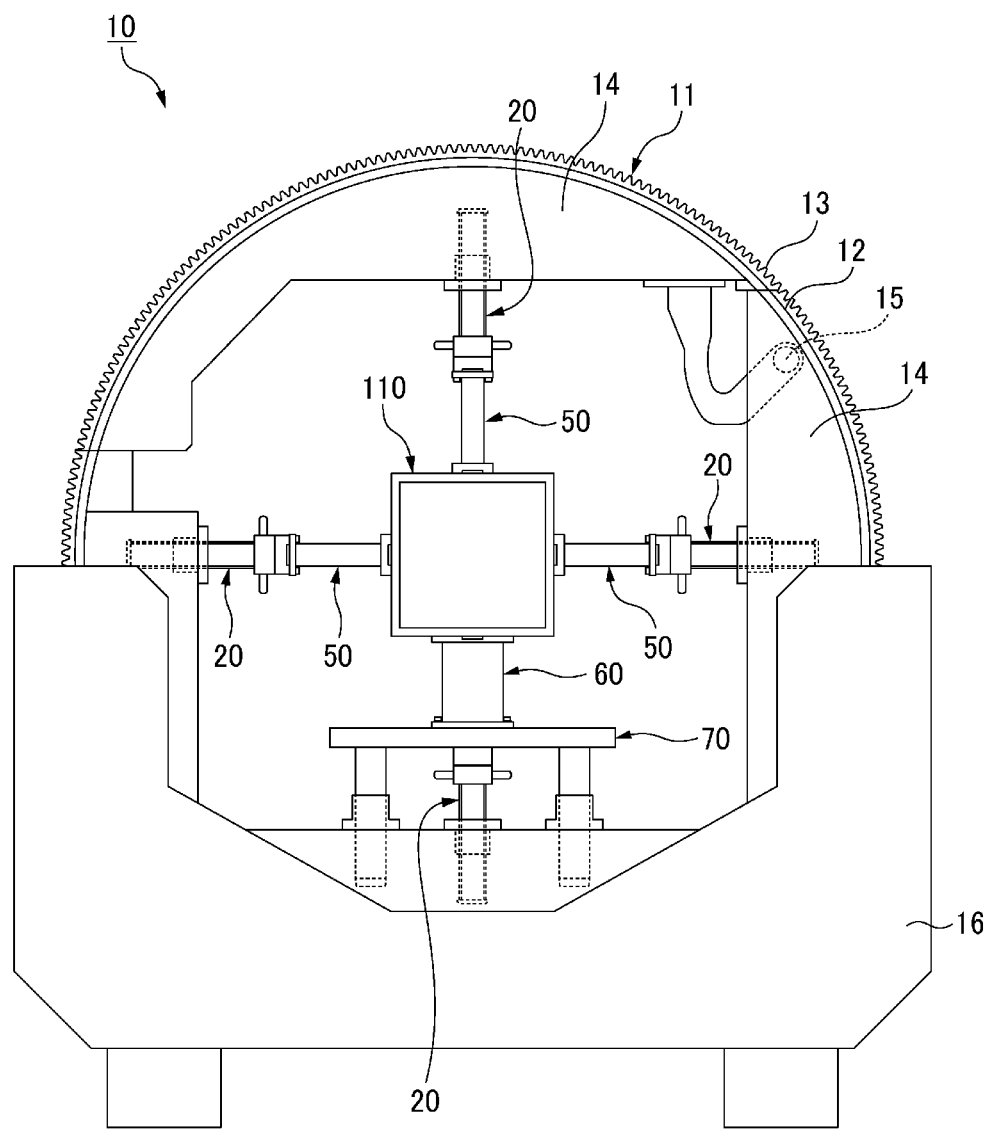
FIG. 12 is a schematic front view of the steel material holding device for describing a method of holding a quadrangular steel pipe.

Next, a method for holding a quadrangular steel pipe 110 using the steel material holding device 10 of the present embodiment is described with reference to FIG. 12.

In this method, in consideration of the size of the quadrangular steel pipe 110 to be mounted, the second extension members 50 are attached to the first to third fixing jigs 20 in advance, and it is unnecessary to attach any more extension members to the first to third fixing jigs 20. Accordingly, in the present method, since the extension member attaching step in the above-described steel material holding method is not necessary, the holding of the steel material is completed by the pre-mounting rotating step, the opening step, the height adjusting step, the jig avoidance step, the placing step, the closing step, and the clamping step. A member having a suitable length is used as the third extension member 60.

The present invention is not limited to the embodiments described above, and can be appropriately modified without departing from the scope of the present invention.

For example, the long engagement holes 46, 56 may not be formed in the connecting portions 44, 54 of the first and second extension members 40, 50.

This application is based on Japanese Patent Application filed No. 2017-018692 on Feb. 3, 2017, the contents of which are incorporated herein by reference.

REFERENCE SIGNS LIST

10 Steel Material Holding Device
11 Holding Portion
12 Annular Portion
13 Rack Gear
14 Frame Body Portion (Attaching Base)
15 Hinge
16 Rotating Portion
20 Fixing Jig
21 Nut
23 Screw Shaft
32 Handle
33 Contact Portion
40 First Extension Member
41 Cylindrical Portion
42 Extension Side Contact Portion 44 Connecting Portion
50 Second Extension Member
51 Cylindrical Portion
52 Extension Side Contact Portion
54 Connecting Portion
60 Third Extension Member
61 Cylindrical Portion
62 Extension Side Contact Portion
64 Connecting Portion
70 Auxiliary Table
80 Hinge
100 H-shape Steel (Steel Material)
101 Flange
102 Web
110 Quadrangular Steel Pipe (Steel Material)
D1 First Direction
D2 Second Direction

The invention claimed is:

1. A fixing jig configured to press and fix a steel material, comprising:
a nut provided on a predetermined attaching base;
a screw shaft screwed to the nut;
a handle attached to the screw shaft, the handle being configured to rotate the screw shaft; and
a contact portion relatively rotatably attached to the handle and configured to contact the steel material or a first extension member,
wherein a plurality of screw holes are formed in an outer peripheral portion of the contact portion,
the first extension member is attachable to and detachable from the contact portion,
the first extension member includes: a long cylindrical portion; an extension side contact portion provided at a tip end portion of the cylindrical portion and configured to contact the steel material or a second extension member; and a connecting portion provided at a base end portion of the cylindrical portion and connected to the contact portion,
the connecting portion includes: a plurality of through holes formed in an outer peripheral portion of the connecting portion; and long engagement holes each extending from each of the plurality of through holes, and
when the connecting portion of the first extension member is connected to the contact portion, a bolt is engaged with the screw hole formed in the contact portion along a longitudinal direction of the first extension member, and the bolt is engaged with the long engagement hole via the through hole of the connecting portion.

2. The fixing jig according to claim 1, wherein the plurality of through holes are formed symmetrically at even-numbered positions in a radial direction.

3. The fixing jig according to claim 2, wherein the bolt includes a circular head portion which is larger than a diameter of the screw shaft, the diameter of the screw shaft is 10 mm or more, and a diameter of the head portion is 1.1 to 1.5 times of the diameter of the screw shaft.

4. The fixing jig according to claim 1, further comprising:
the second extension member detachably attached to the extension side contact portion of the first extension member,
wherein the second extension member includes an extension side contact portion configured to contact the steel material at a tip end portion of the second extension member.

5. The fixing jig according to claim 4, wherein a contact area of at least one of the contact portion of the fixing jig, the extension side contact portion of the first extension member, and the extension side contact portion of the second extension member is within a range of 2500 to 3500 $mm^2$.

6. The fixing jig according to claim 1, wherein the bolt includes a circular head portion which is larger than a diameter of the screw shaft, the diameter of the screw shaft is 10 mm or more, and a diameter of the head portion is 1.1 to 1.5 times of the diameter of the screw shaft.

7. A steel material holding device configured to operate at least in a pair, hold a long steel material and rotate the steel material in an arbitrary posture, the steel material holding device comprising:
a holding portion, which is formed in an annular shape and provided upright along a vertical direction, the holding portion being configured to accommodate the steel material therein and hold the steel material; and
a rotating portion that rotatably supports the holding portion,
wherein the holding portion includes a plurality of fixing jigs provided on each inner surface of the holding portion, the fixing jigs being configured to press and fix the steel material at least in a first direction along a radial direction of the holding portion, and a second direction orthogonal to the first direction and along the radial direction of the holding portion, and
at least one of the plurality of the fixing jigs is the fixing jig according to claim 1.

8. A fixing jig configured to press and fix a steel material, comprising:
a nut provided on a predetermined attaching base;
a screw shaft screwed to the nut;
a handle attached to the screw shaft, the handle being configured to rotate the screw shaft; and
a contact portion relatively rotatably attached to the handle and configured to contact the steel material or a first extension member,
wherein the first extension member is attachable to and detachable from the contact portion,
the first extension member includes:
a long cylindrical portion;
an extension side contact portion provided at a tip end portion of the cylindrical portion; and
a connecting portion provided at a base end portion of the cylindrical portion and connected to the contact portion,
a second extension member is connected to the extension side contact portion of the first extension member via a hinge such that, in a first position, the extension side contact portion of the first extension member is connected to a connecting portion of the second extension member and, in a second position, the extension side contact portion of the first extension member is configured to contact the steel material, and
the second extension member includes an extension side contact portion configured to contact the steel material at a tip end portion of the second extension member.

9. A steel material holding device configured to operate at least in a pair, hold a long steel material and rotate the steel material in an arbitrary posture, the steel material holding device comprising:
a holding portion, which is formed in an annular shape and provided upright along a vertical direction, the holding portion being configured to accommodate the steel material therein and hold the steel material; and
a rotating portion that rotatably supports the holding portion, wherein the holding portion includes a plurality of fixing jigs provided on each inner surface of the holding portion, the fixing jigs being configured to press and fix the steel material at least in a first direction along a radial direction of the holding portion, and a second direction orthogonal to the first direction and along the radial direction of the holding portion, and at least one of the plurality of the fixing jigs is the fixing jig according to claim 8.

10. The fixing jig according to claim 8, the hinge is positioned to connect the extension side contact portion of the first extension member to a connecting portion of the second member, the connection portion being located at an opposite end to the tip end portion of the second member.

11. A steel material holding method using a steel material holding device,
wherein the steel material holding device includes: a holding portion, which is formed in an annular shape and provided upright along a vertical direction, the holding portion being configured to accommodate a steel material therein and hold the steel material; and a rotating portion that rotatably supports the holding portion,
the holding portion is openable and closable,
the holding portion includes four fixing jigs provided on each inner surface of the holding portion, the fixing jigs being configured to press and fix the steel material in a first direction along a radial direction of the holding portion, and a second direction orthogonal to the first direction and along the radial direction of the holding portion, and
the four fixing jigs each include: a nut attached to the holding portion; a screw shaft screwed to the nut; a handle attached to the screw shaft, the handle being configured to rotate the screw shaft; and a contact portion relatively rotatably attached to the handle and being configured to contact the steel material, the steel material holding method comprising:
a pre-mounting rotating step of rotating the holding portion by the rotating portion to make the first direction coincide with the vertical direction before the steel material is mounted on the steel material holding device;
an opening step of opening the holding portion;
a height adjusting step of rotating the handle of the fixing jig positioned on a lower side in the vertical direction to adjust a height of the fixing jig positioned on the lower side in the vertical direction depending on a size of the steel material to be mounted;
a jig avoidance step of rotating the handles of the fixing jig positioned on an upper side in the vertical direction and the two fixing jigs positioned in a horizontal direction to adjust positions of the fixing jig positioned on the upper side in the vertical direction and the two fixing jigs positioned in the horizontal direction so that the fixing jigs do not interfere with the steel material to be mounted;
a placing step of placing the steel material on the fixing jig positioned on the lower side in the vertical direction;
a closing step of closing the holding portion; and
a clamping step of rotating the handles of the fixing jig positioned on the upper side in the vertical direction and the two fixing jigs positioned in the horizontal direction to clamp and fix the steel material.

12. The steel material holding method according to claim 11, further comprising, between the closing step and the clamping step:
an extension member attaching step of attaching at least one extension member to at least one of the fixing jig positioned on the upper side in the vertical direction and the two fixing jigs positioned in the horizontal direction.

\* \* \* \* \*